May 18, 1926. 1,584,839
D. W. CAMERON
RULING EDGE DEVICE
Original Filed Feb. 7, 1922 2 Sheets-Sheet 1
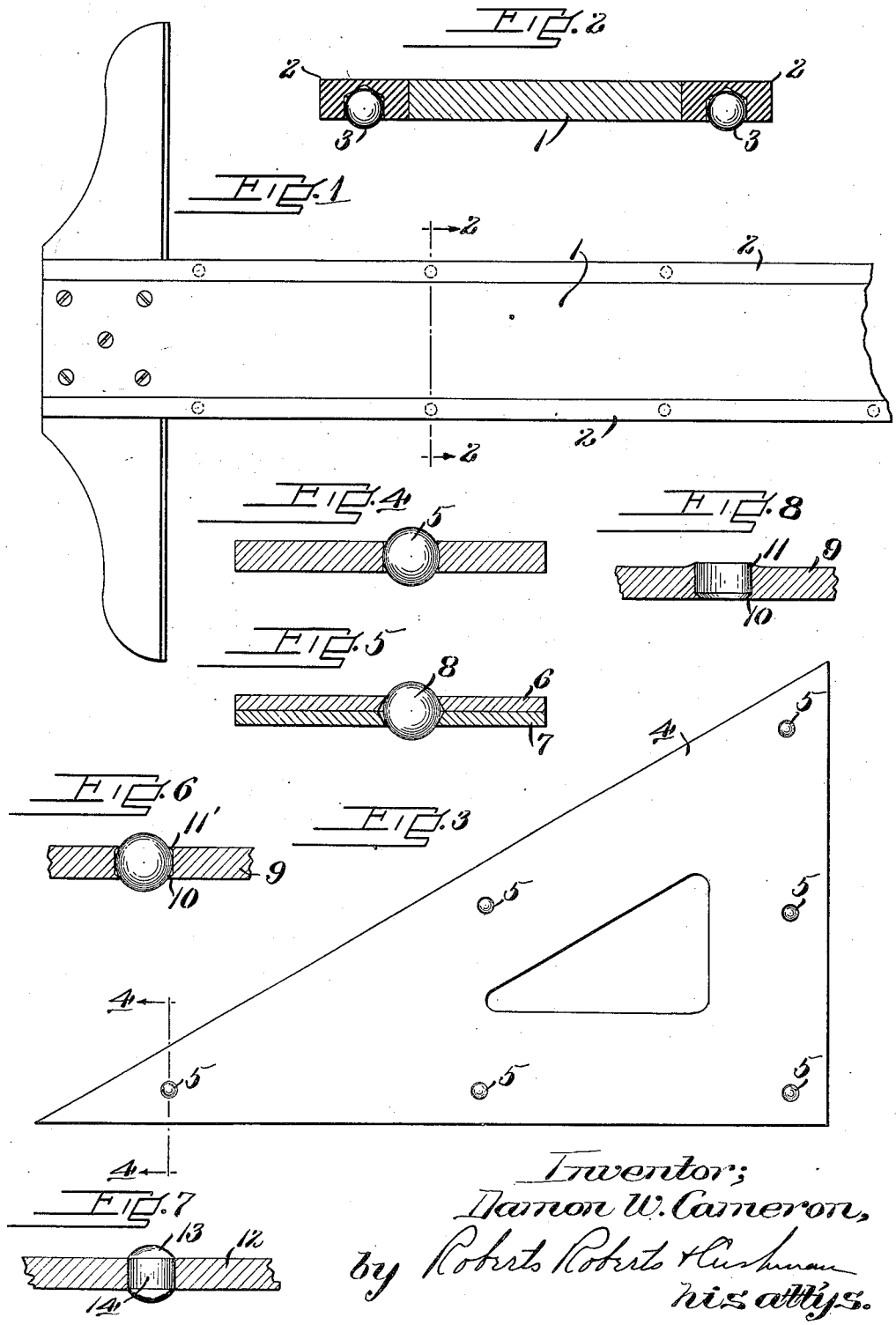
Inventor;
Damon W. Cameron,
by Roberts Roberts & Cushman
his attys.

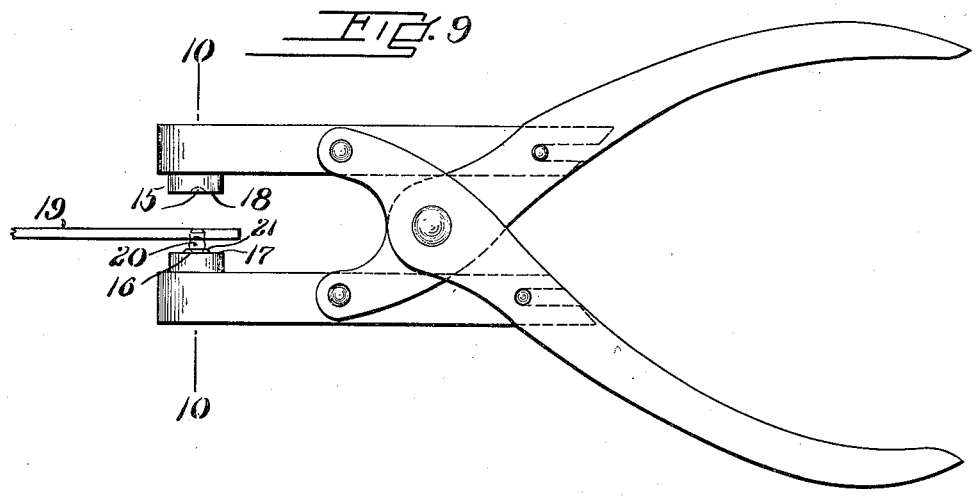
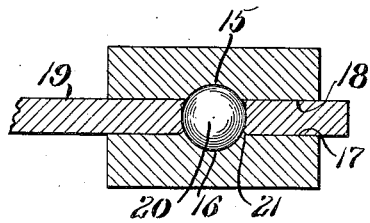
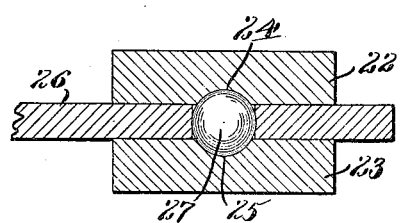

Patented May 18, 1926.  1,584,839

UNITED STATES PATENT OFFICE.

DAMON W. CAMERON, OF BOSTON, MASSACHUSETTS, ASSIGNOR TO ARTHUR F. PROBST, OF BOSTON, MASSACHUSETTS.

RULING-EDGE DEVICE.

Application filed February 7, 1922, Serial No. 534,667. Renewed October 1, 1925.

This invention relates to ruling edge devices such as T-squares, triangles, devices for drawing curves, etc., and the principal objects are to prevent such devices from smudging and smearing the drawings when moved thereover from one position to another, to prevent ink from creeping under the edge thereof in making ink drawings, to permit the devices to be used over parts of a drawing which have been freshly inked, to prevent the devices from being scratched by contact with the drawing or with other parts upon which they are placed, and in general to provide devices of the aforesaid character which are more convenient and durable in use.

The invention involves providing hard smooth protuberances at spaced intervals on the under sides of the devices, the protuberances preferably being spherical or otherwise rounded to contact with the drawings throughout small areas. The protuberances are preferably made in the form of insets of hard material placed in openings in the devices at spaced intervals, the insets projecting from one or both sides of the devices and presenting smooth areas of small contact. The insets may be of metal and in a preferred embodiment of the invention they are in the form of ordinary steel ball bearings. They may be secured in the openings in the devices by means of a pressed fit, the celluloid of which such devices are customarily made being adapted to hold the devices tightly when pressed into the openings. By arranging the insets to project from both sides of the devices they function to hold the devices away from the drawing when either side is presented to the drawing.

In order to illustrate the invention, certain concrete embodiments have been shown in the accompanying drawings, in which:—

Fig. 1 is a plan view of a T-square embodying the invention;

Fig. 2 is a section on line 2—2 of Fig. 1;

Fig. 3 is a plan view of a triangle embodying the invention;

Fig. 4 is a section on line 4—4 of Fig. 3;

Figs. 5, 6 and 7 are similar sections showing modifications;

Fig. 8 is a similar section showing the shape of the opening before the inset has been pressed into;

Fig. 9 shows one way of pressing the insets into the openings;

Fig. 10 is a section on the line 10—10 of Fig. 9; and

Fig. 11 is a similar section showing a modification.

The embodiment of the invention shown in Figs. 1 and 2 comprises a T-square having a body portion 1 of wood or other suitable material and marginal portions 2 of celluloid or the like. The marginal portions 2 have openings drilled at spaced intervals on the under sides and balls 3 of steel or other suitable material pressed thereinto, the openings being slightly smaller than the diameter of the balls so that the balls force the surrounding material outwardly in the horizontal central plane of the balls, the material beneath this plane contracting toward the centers of the openings after the balls have been pressed in to hold the balls tightly in place.

In the embodiment shown in Figs. 3 and 4 the triangle 4 has openings drilled entirely therethrough and balls 5 pressed into the openings. The balls may project farther on one side of the triangle than on the other side so that when the triangle is turned over it is held a different distance from the drawing, but the balls are preferably centered in the openings as shown in Fig. 4 so as to project equally on both sides. By making the openings slightly smaller than the diameters of the balls the balls will embed themselves in the material as illustrated in Fig. 4 and remain firmly in position.

In the modification shown in Fig. 5 the triangle is made up of two parts 6 and 7, the parts having tapered openings adapted to receive the balls 8 and to contact with the balls substantially in the planes of the upper and lower surfaces of the device so as to leave substantially no cracks around the balls, it being understood that the parts 6 and 7 are cemented or otherwise secured together after the balls have been placed in the openings.

In the modification shown in Fig. 6 the opening in the device 9 is not drilled entirely through but only far enough to leave a shoulder 10 at the lower end of the opening. This is further illustrated in Fig. 8 where the device 9 is shown in the form it has after the opening has been drilled and before the ball has been inserted. I have found that in drilling openings in celluloid that a shoulder or ridge is forced up around the opening on the side through which the drill enters as illustrated at 11 in Fig. 8. After the ball has been placed in the opening this ridge may be forced down as hereinafter described, thereby forming a shoulder 11' around the upper edge of the opening as illustrated in Fig. 6.

The embodiment shown in Fig. 7 comprises a device 12 having a cylindrical opening therein and having mounted in the opening a ball 13 the periphery 14 of which has been ground or otherwise shaped into approximately cylindrical form so as to fit tightly in the opening in the device 12 throughout substantially the entire thickness of the device.

The balls or other insets may be forced into the openings in the devices by means of a power press, pincers, hammer, or other suitable means, one suitable device being illustrated in Fig. 9. This device comprises a pair of pliers of the parallel type, the jaws having recesses 15 and 16 formed therein and having faces 17 and 18 surrounding the recesses to engage the opposite sides of the device 19 when the ball 20 has been pressed into the central or other desired position in the device. One or both of the jaws may also be provided with an annular ridge surrounding its recess as indicated at 21 in Figs. 9 and 10 so as to force the material of the device surrounding the opening inwardly toward the ball, such a ridge or shoulder being particularly useful to press a shoulder such as shoulder 11 in Fig. 8 into the position shown at 11' in Fig. 6.

In the modification shown in Fig. 11 the clamping jaws 22 and 23 are flat on their inner sides, except for the recesses 24 and 25, so that they engage the opposite sides of the device 26 flatwise and automatically center the ball 27 in its opening.

I claim:

1. A ruling edge device formed of hard but somewhat yielding material and having openings therein, and balls in said openings, the balls projecting from one side of the device and having a slightly greater diameter than the openings so as to embed in said material around the peripheries of the openings and thereby retain their positions when forced into place.

2. A ruling edge device formed of celluloid and having openings therethrough, and balls in said openings, the balls having a greater diameter than the thickness of the device so as to project from both sides thereof and having a slightly greater diameter than the openings so as to embed in the celluloid around the peripheries of the openings and thereby retain their positions when forced into place.

Signed by me at Boston, Massachusetts, this 6th day of February 1922.

DAMON W. CAMERON.